(12) United States Patent
Shreve et al.

(10) Patent No.: US 11,868,774 B2
(45) Date of Patent: Jan. 9, 2024

(54) PROCESSOR WITH HARDWARE SUPPORTED MEMORY BUFFER OVERFLOW DETECTION

(71) Applicant: TEXAS INSTRUMENTS INCORPORATED, Dallas, TX (US)

(72) Inventors: Erik Newton Shreve, Dallas, TX (US); Eric Thierry Peeters, Frisco, TX (US); Per Torstein Roine, Oslo (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/469,018

(22) Filed: Sep. 8, 2021

(65) Prior Publication Data

US 2021/0406020 A1 Dec. 30, 2021

Related U.S. Application Data

(63) Continuation of application No. 16/835,441, filed on Mar. 31, 2020, now Pat. No. 11,138,012, which is a continuation of application No. 15/923,121, filed on Mar. 16, 2018, now Pat. No. 10,613,864.

(51) Int. Cl.
*G06F 9/30* (2018.01)
*G06F 9/32* (2018.01)

(52) U.S. Cl.
CPC .......... *G06F 9/30145* (2013.01); *G06F 9/321* (2013.01)

(58) Field of Classification Search
None
See application file for complete search history.

(56) References Cited

U.S. PATENT DOCUMENTS

| | | | |
|---|---|---|---|
| 4,674,032 A | 6/1987 | Michaelson | |
| 4,890,221 A | 12/1989 | Gage | |
| 5,107,457 A | 4/1992 | Hayes et al. | |
| 6,202,176 B1 | 3/2001 | Baldischweiler et al. | |
| 6,301,699 B1 | 10/2001 | Hollander et al. | |
| 6,665,793 B1 * | 12/2003 | Zahir | G06F 9/30123 712/228 |
| 7,287,283 B1 * | 10/2007 | Szor | G06F 21/554 713/188 |
| 7,581,089 B1 * | 8/2009 | White | G06F 9/4486 712/242 |
| 8,171,255 B1 * | 5/2012 | Koryakin | G06F 12/1036 718/1 |
| 2002/0029357 A1 | 3/2002 | Charnell et al. | |
| 2004/0103252 A1 | 5/2004 | Lee et al. | |
| 2006/0098496 A1 | 5/2006 | Kawabata et al. | |
| 2006/0161739 A1 | 7/2006 | Gentry et al. | |
| 2006/0225135 A1 | 10/2006 | Cheng et al. | |
| 2007/0101317 A1 | 5/2007 | Shoji et al. | |

(Continued)

OTHER PUBLICATIONS

Dautenhahn, N. et al., Nested Kernel: An Operating system Architecture for Intra-Kernel Privilege Separation, 2015, ACM. pp. 191-206. (Year: 2015).*

(Continued)

*Primary Examiner* — Eric Coleman
(74) *Attorney, Agent, or Firm* — Brian D. Graham; Frank D. Cimino

(57) ABSTRACT

A processor with fault generating circuitry responsive to detecting a processor write is to a stack location that is write protected, such as for storing a return address at the stack location.

20 Claims, 7 Drawing Sheets

(56) References Cited

U.S. PATENT DOCUMENTS

2010/0017660 A1* 1/2010 Tilton ............... G06F 21/52
                                                        714/42
2011/0246725 A1   10/2011 Moir et al.
2013/0124917 A1*  5/2013 Das ................. G06F 11/1479
                                                        714/E11.122
2016/0028767 A1*  1/2016 Ripoll .............. G06F 21/52
                                                        726/23
2016/0371139 A1   12/2016 Stark et al.
2017/0193224 A1    7/2017 Gschwind
2017/0285986 A1*  10/2017 Gopal ............. G06F 12/0897

OTHER PUBLICATIONS

Schroeder,M A Hardware Architecture for Implementing Protection Rings,, 1972,ACM, pp. 157-170. (Year: 1972).*
Communication Pursuant to Article 94(3) EPC dated Aug. 26, 2022, European Application No. 19768218.0, 9 pages.

* cited by examiner

PROCESSOR WITH HARDWARE SUPPORTED MEMORY BUFFER OVERFLOW DETECTION

CROSS-REFERENCES TO RELATED APPLICATIONS

This application is a continuation of U.S. patent application Ser. No. 16/835,441 filed on Mar. 31, 2020, which is a continuation of U.S. patent application Ser. No. 15/923,121, filed Mar. 16, 2018 that issued as U.S. Pat. No. 10,613,864, each of which is incorporated by reference herein in its entirety.

STATEMENT REGARDING FEDERALLY SPONSORED RESEARCH OR DEVELOPMENT

Not Applicable.

BACKGROUND OF THE INVENTION

The example embodiments relate to processors such as microprocessors, digital signal processors, and microcontrollers and, more particularly, to a processor with hardware support to protect against undesirable memory buffer overflows.

Processors include, or have access to, a portion of memory typically referred to a stack, although additional descriptors are sometimes used such as a call stack, execution stack, program stack, and still others. Part of the basis of the term "stack" is that the memory portion is last-in, first-out, so that as information is added to the memory, it aggregates to existing information already there, hence, stacking additional information, and then as information is removed from the memory, it reduces the aggregate stacking of information. Also in this context, information added to the stack is typically referred to as located at the "top" of the stack for illustrative purposes, whereas in actuality the memory area that comprises the stack may be addressed in some architectures using increasing memory addresses, while in other architectures using decreasing memory addresses, but even in the latter case the smallest address is still considered the "top" of the stack.

A primary type of information stored in a stack is an address representing a point in a sequence of executable programming code. In more detail, typically as code is being executed by the processor, a memory store such as a register, often referred to as a program counter, stores a respective memory address of the currently-executed instruction. The program counter is so named because generally code is executed in sequential fashion, so the program counter is able to count, that is increment, so as to advance execution of a next instruction at an address immediately following the addresses of the previously-executed instruction, and so forth for a particular block of code. However, at various points in this type of successive addressing of executable instructions, a change in the sequence may be desired, as is achieved by a sequence-changing instruction, examples of which may include a "call," "branch," "jump," or other instruction, that directs the execution sequence to a target instruction that has an address that is not the next sequential address following the currently-executed instruction. The target instruction is likely part of a group of other instructions, sometimes referred to as a routine or subroutine. In connection with the sequence-changing (e.g., call) instruction, which therefore will change the addressing to something out of continuing sequential fashion, in one common approach the current or next incremental value of the program counter is stored (often called "pushed") to the stack, so that after the target routine is completed, the address flow is restored back to the sequence that was occurring prior to the call, that is, the instruction sequence "returns" to the next instruction that follows the call to that routine. Alternatively, some architectures (such as Advanced RISC Machine (ARM)) do not immediately push the program counter to the stack, but instead the return address is stored in a register, and the value of the return register is then pushed to the stack only if the called function does (or might) call another function. In any event, when an address is pushed to the stack, the return following a call can be accomplished by obtaining the address that was pushed onto the stack when the call occurred, and that value is said to be "popped" from the stack, thereby removing it so that the top of the stack is thusly moved to the next least significant word on the stack. The preceding description assumes only a single call to a routine that eventually returns directly back to the address that follows the sequence that follows the single call. As known in the art, however, a first routine, when active and prior to its completion, may call a second routine, in which case this latter call again pushes an additional return address onto the stack, where the additional program counter address identifies the executable instruction address to which program flow should return once the called second routine is complete; thus, in the example of two successive calls (prior to a return), there would be on the stack the program return address from when the first routine was called, atop which is the program return address from when the second routine was called. Such a process may repeat among multiple routines, where the stack therefore receives an additional new address for each additional call, and whereby each added address is successively popped as returns are executed from each successively called routine. The stack, therefore, provides an indication to eventually complete each called routine and to return the execution address when each respective routine is called.

While the stack technology, as has been described above, has long provided a sound manner of controlling executable instruction flow, an unfortunate byproduct has been either the unintentional failure of, or a deliberate attack on, a stack when a program counter address in the stack is overwritten prior to when it is needed to re-establish proper executable code flow. For example, a stack typically has a maximum capacity provided by a finite number of storage locations; thus, if an address is written beyond the maximum capacity, then a stack overflow is said to have occurred, giving rise to either erratic behavior or a reported fault if the event is recognized, such as via software (e.g., operating system) running on the system and or via a "top of stack register," which is used in some hardware approaches to indicate the topmost stack location and therefore also usable to detect exceeding that location. As another example, in addition to program counter addresses, certain architectures allow the stack to be used, typically in temporary fashion, to store data and such storage location(s) is typically referred to as a "stack frame" or "call frame." Such a frame typically is architecture and/or Application Binary Interface (ABI) specific, but it often contains the parameters to the called function and the return address, along with any temporary data space for the called function. In this case, therefore, additional memory locations in the stack are temporarily reserved for the stack frame, adjacent or including the stored return address, and in the stack memory space. If a buffer is filled beyond its intended size, such a fill may overwrite a valid return address(es) and/or the data stored in the current or even previous stack frame(s).

Further to the preceding, various nefarious attack techniques have evolved for purposes of "hacking" or otherwise interfering with computing systems, so as to gain control of a processor and compromise its intended operation, with various consequences that can be from relatively benign operations to undermining critical functionality and security breaches. In this regard, stack overflows have been a common tool of such attacks, and are sometimes referred to as smashing the stack. In this case, the "hacker" attempts to cause program control to move to a location other than the proper-operation stack return address; this may be achieved, for example, by overwriting a valid return address with a different illicit address, so that program flow will, upon return to the stack, pop the illicit address and direct executable flow to other instructions. Such other instructions also can be nefariously loaded into the system and thereby executed following the smash, or alternatively hackers also have learned to use subsets or excerpts of valid preexisting code, sometimes referred to as gadgets, where further exasperating results can be reached by sequentially stitching together different gadgets so as to combine the respective functionality of each gadget toward accomplishing a hacker-implemented, while originally-designed-unintended, function or result in the system. This latter approach is sometimes referred to as return-oriented programming (ROP), as each gadget ends with a respective return. The return at the end of each gadget pops a return address from the stack—an alternative address that the hacker wrote via the buffer overflow—this causes the processor to continue execution, starting next at that alternative address, which thereby begins the start of another gadget, which can then be repeated across multiple such gadgets. Indeed, use of gadgets in this matter may allow a hacker to approach or reach so-called Turing (named after mathematician Alan Turing) completeness, meaning generally providing sufficient data manipulation operations to simulate any single-taped Turing machine, that is, to accomplish all algorithms within a set of such algorithms, which translates loosely to mean able to accomplish a wide variety of functions.

Given the preceding, the prior art has developed certain software and hardware (e.g., Data Execution Prevention (DEP)) techniques in an effort to prevent and/or detect the unintentional or nefarious redirection of program control flow via an overwritten return address in a buffer/stack. However, such approaches have one or more drawbacks, including: (1) costly overhead(s); (2) requiring developers to implement or learn new tools; (3) requiring exhaustive testing; (4) requiring recompilation and/or source code modification, which is not necessarily possible with third party libraries; and (5) hackers have found ways around the prior art approaches, including ROP as a workaround of DEP. Thus, while the prior art software mitigation techniques to stack overflow have served various needs, the present inventors seek to improve upon the prior art, as further detailed below.

BRIEF SUMMARY OF THE INVENTION

In an example embodiment, there is a processor, comprising: (1) circuitry for executing program instructions, each program instruction stored in a location having a respective program address; (2) circuitry for storing an indication of a program address of a program instruction to be executed; (3) a memory stack, comprising a plurality of stack storage spaces, each stack storage space operable to receive a program address as a return address; (4) a plurality of write protection indicators corresponding to respective stack storage spaces; and (5) circuitry for generating a fault in response to detecting a processor write is directed to a selected stack storage space for which a respective write protection indicator, in the plurality of write protection indicators, indicates the selected stack storage space is write protected.

Numerous other inventive aspects are also disclosed and claimed.

BRIEF DESCRIPTION OF THE SEVERAL VIEWS OF THE DRAWING

FIGS. 4a through 4f illustrates stack $24_{STK}$ in an example of the application of method 300 of FIG. 3.

DETAILED DESCRIPTION OF EMBODIMENTS

Figure 1:
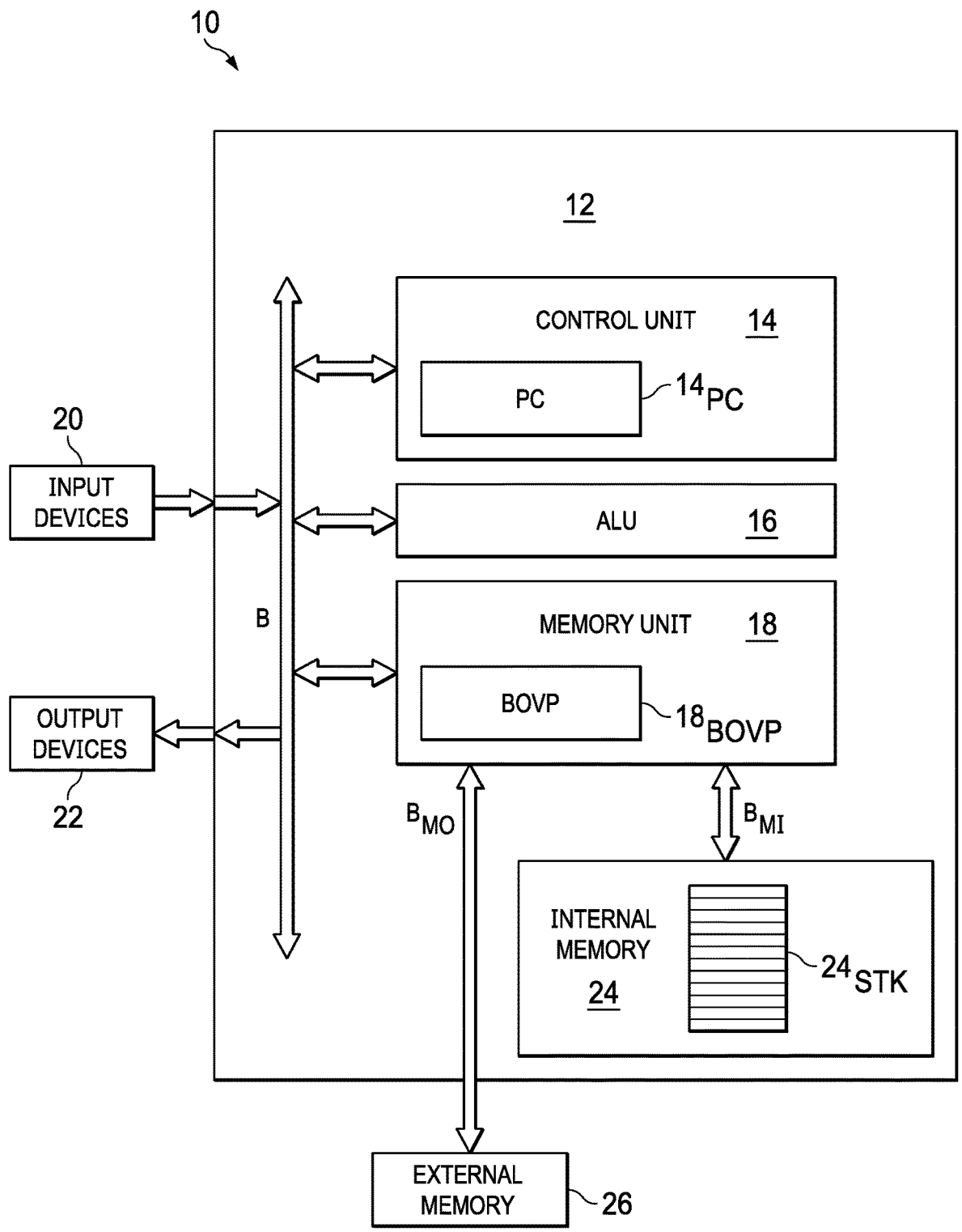
FIG. 1 illustrates an electrical and functional block diagram of an example embodiment processor.

FIG. 1 illustrates an electrical and functional block diagram of an example embodiment processor 10. As introduced in the above Background of the Invention section, a processor should be understood to be one of various computational circuits including the functions described in this document and, therefore, that may include any of a microprocessor, digital signal processor, microcontroller, and the like. Processor 10 includes various blocks that are well-known in the art as well as example embodiment improvements, each of which is discussed below.

Looking first to well-known aspects of processor 10, it is typically implemented as a single integrated circuit device 12, as shown by an appropriate block in FIG. 1. Within that block (or separately, as may be partitioned by one skilled in the art), processor 10 includes generally three main blocks, including a control unit 14, an arithmetic logic unit (ALU) 16, and a memory unit 18, and each block may communicate with the others, shown in FIG. 1 by bidirectional coupling to a bus B. Bus B is also connected to receive data from external input devices 20, and to provide data to external output devices 22. Moreover, memory unit 18 may communicate with internal memory 24, via a bus $B_{MI}$, and with external memory 26, via a bus $B_{MO}$. In slightly greater detail, control unit 14 controls activation and operation of the other blocks, and in general causes the sequencing of instructions of executable code, typically in response to some higher level programming, including possible source code and/or operating system software. In this regard, therefore, control unit 14 is also shown to include a general indication of a program counter $14_{PC}$, which could be realized elsewhere in processor 10. Hence, control unit 14 may cause memory unit 18 to fetch program instructions from either internal memory 24 (e.g., RAM, ROM) or external memory 26 (e.g., flash), according to a sequence defined by a particular program and potentially with other efficiency measures (e.g., predictive techniques and the like). Instructions fetched by memory unit 18 are provided to one or more execution pipelines associated with ALU 16, where, again under control of control unit 14, instructions are executed so as to accomplish data moves as well as logical and mathematical operations, and the results are provided back to memory unit 18 for storage, again in either internal memory 24 or external memory 26. On a broader scale, the above input/output of instructions and data also may be performed in combination with receipt of such information from input devices 20, and provision of such information to output devices 22. Lastly, note the preceding discussion of processor 10 is by way of a broad overview context of processor architecture and for sufficiency of understanding of the example embodiments; however, one skilled in the art, however, will readily understand that processors may, or be characterized to, include various other aspects in connection with processing architecture, connectivity, and functionality.

Looking to the remaining aspects of FIG. 1, the following discussion provides an introduction to example embodiment improvements of processor 10. Specifically, internal memory 24 is shown to include a memory stack $24_{STK}$, which, like the prior art, is a dedicated portion of memory space in internal memory 24, where the number of words stored in the stack can vary widely according to architecture, Application Binary Interface (ABI), and specific application code. Further, the word width is defined by the CPU architecture (e.g., $2^N$ bits for N≥4, such as 16 bits, 32 bits, 64 bits, or the like). Also like the prior art, stack $24_{STK}$ in general exists and functions according to known principles described in the Background of the Invention section of this document, that is, to receive pushed addresses from, or relating to, program counter $14_{PC}$ (either directly or via an intermediate register) and to facilitate the popping of such addresses from the stack back to program counter $14_{PC}$, either directly, or through a return register (e.g., the Link Register in ARM processors), so as to return program execution flow to a next instruction that follows the instruction that caused the pushed address, while also providing some buffer space to which other information may be temporarily stored and readily accessed from the stack memory space. Also by way of introduction, note that FIG. 1 shows only a single stack $24_{STK}$ by way of example, as typically a system may include more than one such stack, where each stack is a region of memory and in most systems may start and end anywhere. Indeed, by way of example, multiple stacks are common, for example, when using a real-time operating system (RTOS) in which typically each thread has its own stack.

Completing FIG. 1, per the example embodiments, stack $24_{STK}$ (as may be other stacks) is either configured, and/or operates in conjunction with, a buffer overflow protection (BOVP) circuit $18_{BOVP}$, which is shown as part of memory unit 18. Particularly, and as detailed in the remainder of this document, the combination of BOVP circuit $18_{BOVP}$ and stack $24_{STK}$ provides enhanced hardware protection against overwriting values, particularly directly or causally of a return address, on stack $24_{STK}$, where such overwrites otherwise may be caused by either mistake (e.g., errant use of certain code, such as in C or C++) or by intentional hacking attacks seeking to deliberately smash the stack.

Figure 2:
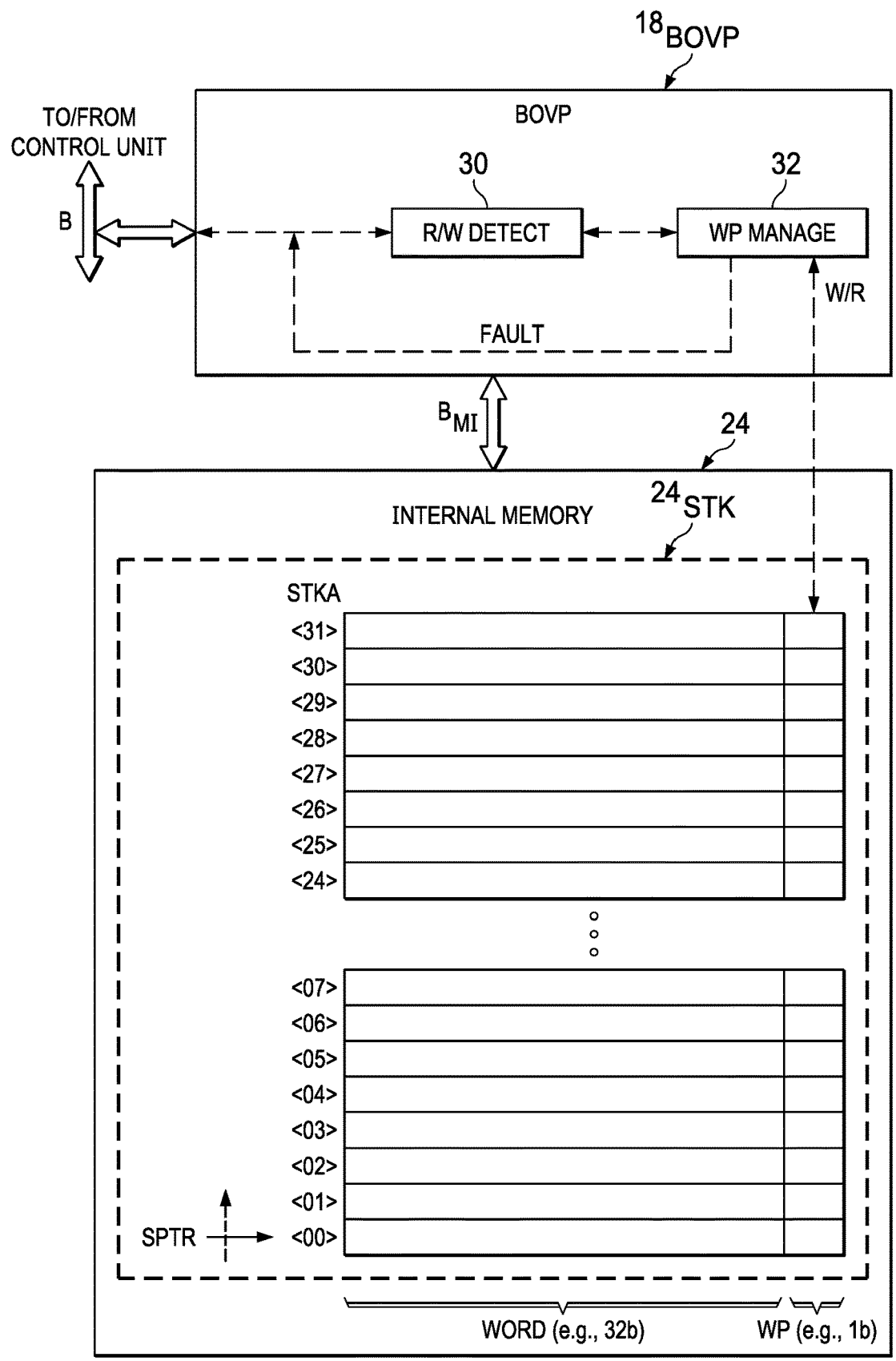
FIG. 2 illustrates a more detailed block diagram of BOVP circuit $18_{BOVP}$ and stack $24_{STK}$ from FIG. 1.

FIG. 2 illustrates a more detailed block diagram of BOVP circuit $18_{BOVP}$ and stack $24_{STK}$ from FIG. 1. In an example embodiment, BOVP circuit $18_{BOVP}$ includes a read/write (R/W) detect block 30 and a write protect (WP) manage block 32. Each of these additional blocks is described below, and each may be constructed by one skilled in the art given the descriptions provided in this document. Moreover, note that preferably BOVP circuit $18_{BOVP}$ is a hardware implementation, as embodying it in software, or even particular portions therefore, would impose a considerable if not prohibitive amount of run-time overhead.

BOVP circuit $18_{BOVP}$ is connected to sufficient circuitry, as may be based on a specific platform in which processor 10 is implemented (e.g., ARM, x86, and one of various processors from Texas Instruments Incorporated), so as to detect each instance when either a read or write is requested in connection with stack $24_{STK}$. For example, a write would occur in connection with a push instruction, seeking to push a return address onto the stack. Similarly, a write may occur when data is copied from one location to the stack, where a portion of stack $24_{STK}$ is temporarily allocated as a buffer. As another example, a read would occur in connection with a pop instruction, seeking for example to read a return address that was earlier pushed onto stack $24_{STK}$. As a final example, a read also may occur when data is read from a portion of stack $24_{STK}$ that is temporarily allocated as a buffer.

WP manage block 32 manages write protection indicator data that is associated with each memory location (i.e., word) in stack $24_{STK}$. In an example embodiment as illustrated in FIG. 2, the write protection data is implemented as a single bit appended to each word location in stack $24_{STK}$. Thus, also in FIG. 2, stack $24_{STK}$ is shown to have memory words of 32 bits each, and appended (e.g., next to the least significant bit) to each word is an additional write protection WP indicator bit. In one example embodiment, therefore, the memory (e.g., SRAM) that is to include stack $24_{STK}$ is constructed to include one additional bit beyond the nominal size of the memory words (e.g., 32 bits). In such an approach, the processor memory may be subdivided so that a portion of the memory is only word wide, while another portion includes an additional bit per memory word. As detailed later, alternative example embodiments are also contemplated to associate a WP indicator bit with each memory word, without expanding the width of the memory word beyond the nominal word size. In all events, and as further detailed below, WP manage block 32 is conditionally operable to read or write any WP indicator bit in stack $24_{STK}$, where the conditions for such reading and writing are later explained. Further in this regard, each word (and its associated WP indicator bit) is separately addressable which is shown by convention in FIG. 2, and in this document is referred to by a stack address STKA<xx>, where xx is an address or location indication, and for sake of example in FIG. 2 there are 32 such addresses, shown as STKA<00> through STKA<31>. Lastly in this regard, FIG. 2 illustrates a stack pointer SPTR which is a value (e.g., stored in a register) that identifies a current stack address, and possibly its corresponding WP indicator bit. Thus, in FIG. 2, stack pointer SPTR is pointing to the top (i.e., STKA<00>) of an empty stack $24_{STK}$, that is, to the next location into which a return address would be pushed (here, since no information is yet written, the top is the first word that can be written). Moreover, also in the example of FIG. 2, stack pointer SPTR is shown to move toward each new top of the stack by moving vertically upward with each respective increment of a stack address; as known in the art, however, some stack orientations are considered to have a movement of the stack pointer "toward the top" to be associated with a decrementing of the stack address, where in either event in this document it should be understood that adding return addresses to the stack is denominated as effectively changing the top of the stack, as indicated by the stack pointer, given the addition of the return address, advancing to the next location to which information may be added to the stack (and henceforth referred to as the "top" of the stack), whether such movement may be achieved in different respective example embodiments via an increment, or a decrement, of the stack address.

Figure 3:
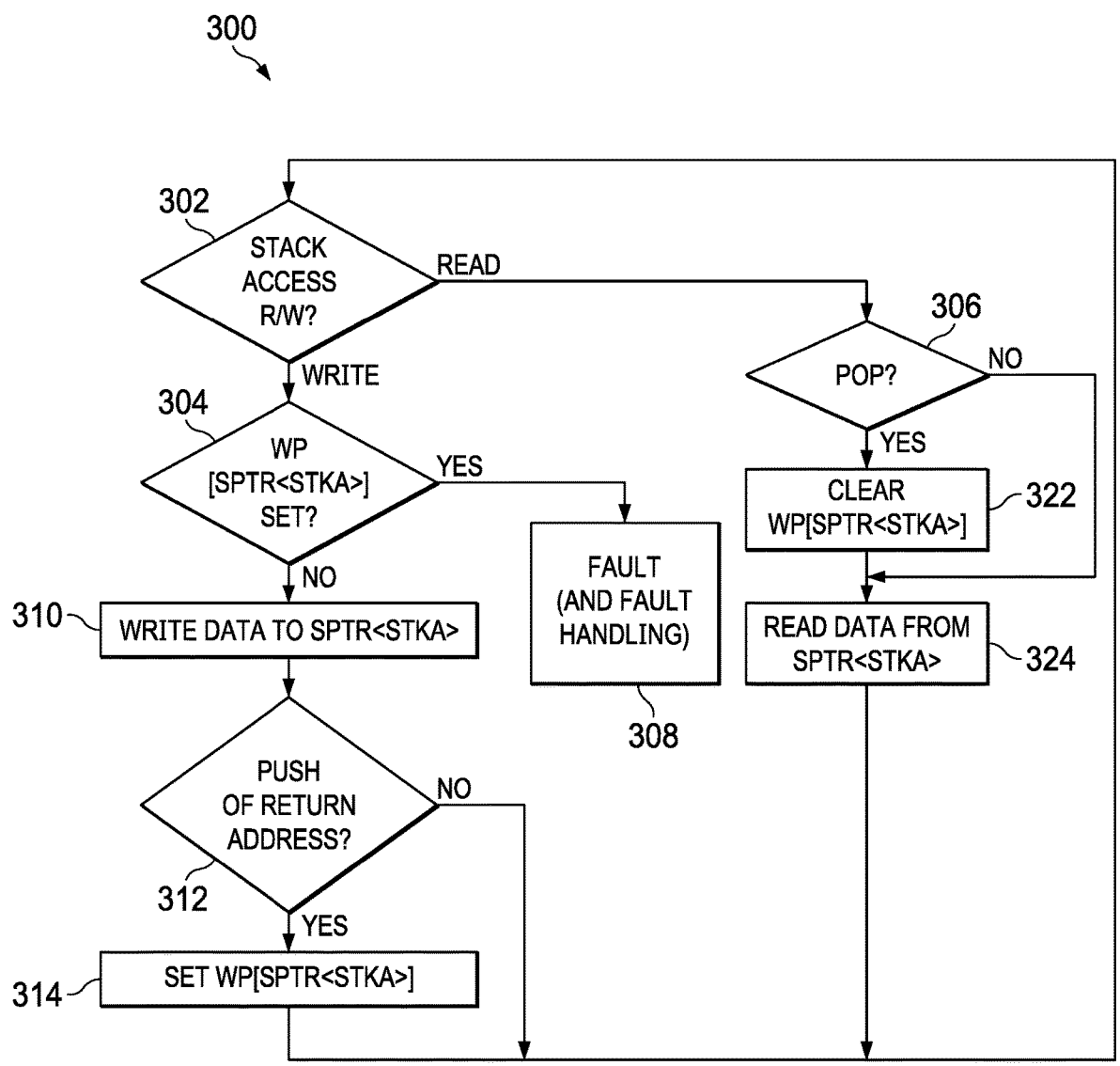
FIG. 3 illustrates a flow chart of an example embodiment method 300 of operation of processor 10 of FIG. 1.

FIG. 3 illustrates a flow chart of an example embodiment method 300 of operation of processor 10, and with particular reference to, and implementation by, the blocks of FIG. 2, all in connection with the reading and writing of stack $24_{STK}$. Method 300 starts, therefore, with a stack access step 302, which is detected by R/W detect block 30 when either a read or write is requested with respect to stack $24_{STK}$. In this regard, R/W detect block 30 includes sufficient circuitry (e.g., logic) coupled to the appropriate signals, such as an instruction bus, trace interface signals, or other signals from hardware, that can be monitored and detected when stack read/write operations are attempted, while further distinguishing a stack push from other stack writes, and also further distinguishing a stack pop from other stack reads. Note that identifying, monitoring, and detecting such signals may be achieved by one skilled in the art, given the particular architecture of processor 10. In any event, if the requested operation is a write, then method 300 continues to step 304, whereas if the requested operation is a read, then method 300 continues to step 306. Each of these alternatives is described below.

Write protection per the example embodiment usage of WP indicators is now introduced, and discussed in greater detail later. By way of introduction, and as will be described in the remainder of the document, a WP indicator bit is set so as to protect against a later overwrite of a respective return address that is pushed to stack STK $24_{STK}$, whereby if a stack-stored return address, as protected by its respective WP indicator bit, is sought to be overwritten, a fault is generated so as to prevent the overwriting of the already-stored and existing protected return address. Thus, when a stack access is instigated to write, either a new return address or buffer information, to a stack location that does not already store an existing protected return address, the write access is permitted. Moreover, if the instigated stack access is to write a new return address to an unprotected (i.e., WP indicator not set) stack word, then with that write the WP indicator is set so as to thereafter protect that new return address from being overwritten; if, however, when the stack access is instigated to push a new return address to a stack location that does already store an existing protected return address, then a fault is generated so as to prevent the overwriting of the already-stored and existing protected return address. These and other contingencies are further understood below.

In step 304, having been reached because a detected write access to stack $24_{STK}$ is detected, then step 304 evaluates the WP indicator bit for the address to which the write is seeking to store data and, more particularly, evaluates if that WP indicator bit is already set. If the WP indicator bit is set, then method 300 proceeds from step 304 to step 308, whereas if the WP indicator bit is not set, then method 300 proceeds from step 304 to step 310.

Step 308, having been reached when an attempted write to a stack address having a corresponding set WP indicator bit is detected, generates and thereby reports a fault. In FIG. 2, therefore, this event is shown by an asserted FAULT signal coupled to bus B as may be received and responded to by any circuit coupled thereto. Note further that fault reporting may be accomplished by various manners as known in the art, such as via an interrupt to any further program execution, actual or speculative, and some event handler then processes the fault accordingly. Further in this regard, therefore, note that the fault setting of step 308 thereby asserts the fault when a either a push or a non-push write is attempted to a stack location for which the corresponding WP data (e.g., as a $33^{rd}$ bit in an SRAM word) is set. Moreover, as introduced above, a WP indicator bit is set when a return address is pushed to stack STK $24_{STK}$, so steps 304 and 308 thereby generate a fault when there is an attempt to overwrite such a pushed return address. Thus, whether such an effort is by mistake (e.g., errant C code) or by an intentional effort to smash the stack (e.g., ROP attack), the failure or undesirable change in results, control, and/or security that would occur by allowing that return address to be overwritten is avoided, and instead a fault is generated. While not shown in FIG. 3, therefore, method 300 may branch to an appropriate fault handler, with return to method 300 later, for example, available based on the response to the fault.

Step 310, having been reached because the requested stack access is a write operation and the WP indicator for the address to be written is not set, executes the requested write to location SPTR<STKA>, either as a push read or, by way of example, as a buffer write such as in the case of a non-push write. As a push, the write is of a return address from another register or from program counter $14_{PC}$ (or an offset or increment thereof), so that on return the then next processor-executed instruction will be at the return address. Next, method 300 continues to step 312.

Step 312 determines whether the step 310 write is a push operation that will include an attempt to write a return address to stack $24_{STK}$. Note that often a push operation necessarily by definition will attempt to so write to a stack (e.g., stack $24_{STK}$), but also contemplated herein is that there can be push operations that do not push the return address. Thus, also included in step 312 is a determination of whether the push is of the return address. This determination can be achieved in an example embodiment, for example, by detecting when the value comes from PC or a register specifically used to hold the return address (e.g., LR register in ARM architecture). Hence, some example embodiments monitor processor signals to determine if this is the case, while in an example embodiment ARM implementation, the example embodiment relies on the compiler convention that the first instruction executed in a function is a push of values including the LR register value. If step 312 detects the requested write is a push operation, then method 300 continues to step 314, whereas if step 310 detects the requested write is not a push operation, then method 300 returns to the next instance of step 302.

In step 314, having been reached because a detected write to stack operation is further detected as a push operation (that will attempt to write an address to the stack), then WP manage block 32 sets the WP indicator bit for the stack memory location into which the return address is to be written, that is, at the location of the current stack address pointer, shown in FIG. 3 as address SPTR<STKA> and where the WP indicator at that location is shown as WP[SPTR<STKA>]. Thus, for sake of explanation in this document, the setting of this indicator bit will be by asserting it to a binary value of 1, thereby indicating that the return address that will be written into the same respective address, STKA, should be write protected so long as that WP indicator remains set. Moreover, were this instance of step 314 occurring with respect to the point shown in FIG. 2, the set WP indicator would be achieved by setting the least significant bit at SPTR<00> to a binary 1. Note also that in other example embodiments, optionally an instruction may be permitted to set any WP bit, thereby allowing protection against any corresponding address on the stack. In any event, after step 314 sets the WP indicator, next, method 300 returns to a next instance of step 302.

From the preceding, one skilled in the art will appreciate that step 310 is reached after a write access is instigated, be it either a push or some other type of write (e.g., buffer copy). Note further, therefore, that as of the completion of steps 312 and 314, for a given stack address, a valid return address has been written and its respective WP indicator bit has been set. Of course, for a non-push write, again the data is written to the location SPTR<STKA>, but for such written data the WP bit is not set. Also in this regard, note that in different example embodiments, the order of steps 314 and 312 may be reversed, or may even occur concurrently as an atomic step, so long as it is ensured that both occur if the write to the stack is of a return address; from an implementation standpoint, one might be easier than the other depending on implementation details. In any event, once both steps are complete (or just step 312 for a stack write that does not include a return address), then next method 300 returns from step 312 to step 302, thereby awaiting a next stack access.

Having described the write-related steps of method 300 (shown to the right of FIG. 3), attention is now turned to the method steps when step 302 determines that the stack access is a read, starting with step 306. Step 306 determines whether the read is a pop operation, that is, seeking to read a return address from stack $24_{STK}$ to put into CPU program counter $14_{PC}$, so as to thereby restore program flow to the next address following that of the instruction (e.g., branch) that caused the earlier program flow departure from its sequence. Note that the step 306 determination also may be made in response to detecting certain signals based on processor architecture. If step 306 detects the requested read is a pop operation, then method 300 continues to step 322, whereas if step 306 detects the requested read is not a pop operation, step 322 is skipped and method 300 continues to step 324. Detection of a pop operation may be performed by monitoring the value in the stack pointer. If the stack pointer value is moved toward the bottom of the stack, then all values between previous stack pointer value and the new stack pointer value are taken as being popped. In step 322, having been reached because a detected read from the stack operation is further detected as a pop operation, then WP manage block 32 clears the WP indicator bit for the stack memory location from which the return address will be read, that is, at the location of the current stack address pointer (i.e., WP[SPTR<STKA>]). Thus, for sake of explanation in this document, the clearing of this bit will be by de-asserting it to a binary value of 0. Note that with the WP indicator thusly de-asserted to a value of 0, if that address STKA is later sought to be written, then step 304 described above in connection with stack writing, will detect the cleared WP indicator and thereby permit the write by transitioning to step 310. In any event, after step 322, method 300 continues from step 322 to step 324.

In step 324, the requested read is executed, either as a pop read after step 322 or as a buffer read directly from finding a non-pop read in step 306. Thus, as a pop, the read is of the return address (or other information) from the stack and is of the memory word at the location of the current stack address pointer (i.e., SPTR<STKA>). While not shown, the read may be into another register or directly into program counter $14_{PC}$, so that the next processor-executed instruction will be that at the return address. Note, therefore, that as of the completion of steps 322 and 324, for a given stack address, a valid return address has been read and its respective WP indicator bit has been cleared. Of course, for a non-pop read, again the data is read from location SPTR<STKA> and provided to a destination as may be indicated by the non-pop read instruction. Also, similar to the above description of steps 314 and 312, the order of steps 322 and 324 also may be reversed, so long as it is ensured that both occur if the read from the stack includes a pop, and implementation may depend on other implementation details. In any event, once steps 322 and 324 are complete, next method 300 returns from step 324 to step 302, thereby awaiting a next stack access.

FIGS. 4a through 4f again illustrate stack $24_{STK}$ and with certain indications in various memory words as well as with movement of stack pointer SPTR so as to illustrate an example of sequence of method 300. In this first example, it is assumed that the programming language (e.g., C) performs according to the code shown in the following Table 1:

TABLE 1

| C | ARM assembly |
|---|---|
| void hello(uint4_t len)+{ | hello: |
| | PUSH LR |
| uint32t buf[4] | ADD SP, #4 |
| . . . | . . . |
| memcpy(buf, rx_buf, lne); | . . . |
| . . . | |
| return; | ADD SP, #-4 |
| } | POP PC; |

Prior to any instruction execution, stack $24_{STK}$ appears as was the case in FIG. 2, with stack pointer SPTR pointing to the bottom of the stack (i.e., STKA<00>).

Next, and per Table 1, the first instruction calls a "hello" routine, in which case the corresponding assembly language seeks to push the program counter address, stored in the LR register, onto stack $24_{STK}$. Thus, the attempted push is a stack access write attempt, as detected in step 302 of method 300. Moreover, the attempted write is to an empty stack location having a cleared WP indicator as confirmed in step 304, thereby advancing flow to step 310. Step 310 further confirms the write as a push of a return address (e.g., push of LR), which directs step 314 to set the WP indicator at STKA<00> following step 310 where the return address was pushed to that same address. In this regard, FIG. 4b illustrates stack $24_{STK}$ after these steps, in which case step 314 has set the WP indicator bit for STKA<00> to a value of 1, and step 310 has written the LR data to STKA<00>.

Next, the C instruction "uint32t buf[4]" results in reserving buffer space on top of the pushed LR value in stack $24_{STK}$. In this regard, the instruction of "uint32t buf[4]" causes a value of 4 to be added to stack pointer SPTR, which therefore is shown in FIG. 4c to have advanced from STKA<00> in FIG. 4b to STKA<04> in FIG. 4c.

Next, the C instruction "memcpy(buf, rx_buf, len);" causes a sequence of copies from another memory, to stack $24_{STK}$, of a buffer of words having a length set by the variable rx_buf, thus, in the current example, assume that rx_buf is defined as having four words, so that each of those four words is to be written to stack $24_{STK}$. Thus, each write again represents an attempt to access the stack as detected by step 302 of method 300. For example, for the first write, step 304 first checks whether the WP indicator bit for the STKA address at issue (i.e., STKA<04>) is set; in the current example, the WP data is not set, so next step 310 performs the write, as shown in FIG. 4d. The same process repeats for each of the remaining three words to be copied from memory to stack $24_{STK}$, so as of the completion of three more iterations of steps 304, 310, and 312, stack $24_{STK}$ appears as shown in FIG. 4e. Note also in this context that for each write to the buffer, the stack pointer does not move and hence SPTR is still shown pointing to STKA<04>, as the address used for the rx_buff access is tracked separately from the stack pointer.

Given the preceding, the buffer data has been successfully stored in stack $24_{STK}$ and may be quickly and readily accessed as desired during the routine. As shown in Table 1, eventually the routine is completed, as shown by the C language "return;" instruction. In response to that instruction, a value of −4 is added to stack pointer SPTR, thereby positioning it at address STKA<00> and, therefore, pointing to the LR return address as shown in FIG. 4f. Next, a read is sought from that address by the assembly language POP instruction, which again invokes steps 306, 322, and 324 of method 300. In step 322, therefore, the previously-set WP indicator bit is cleared, and in step 324 the LR value at address STKA<00> is read as shown in FIG. 4f, from where that value is returned to the processor program counter $14_{PC}$, whereby as a result the next executed instruction is at the return address and thereby properly returns execution to the instruction following the routine call.

Figure 4A:
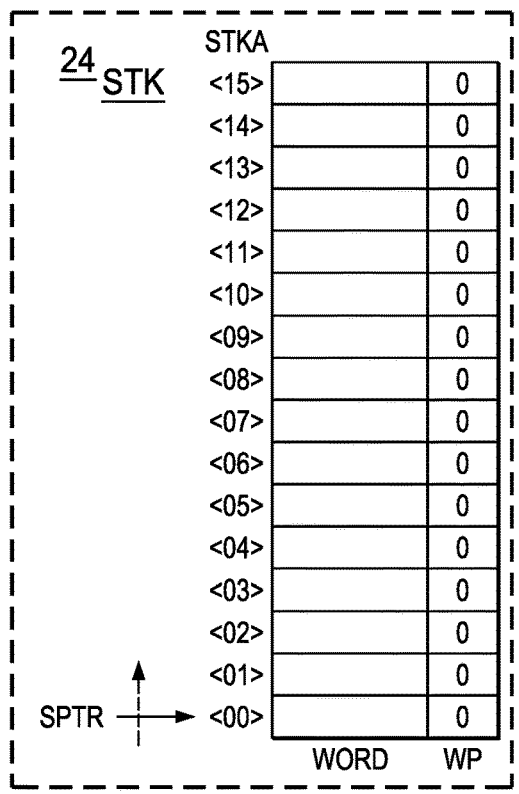
Figure 4B:
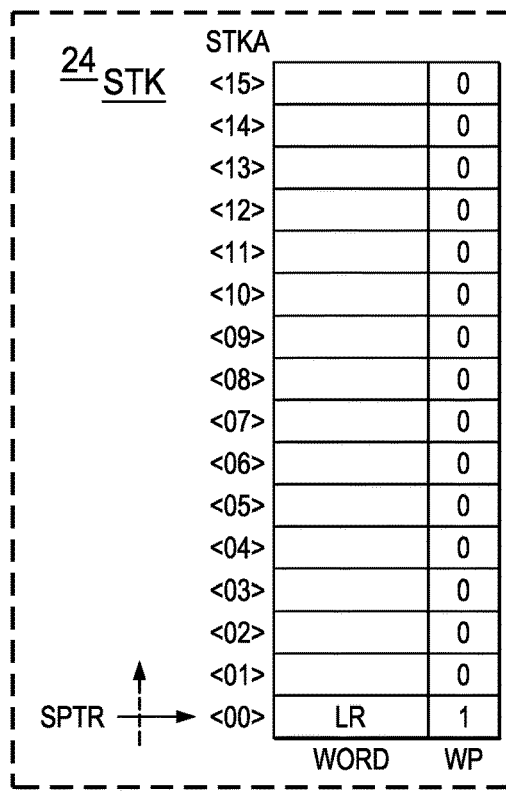
Figure 4C:
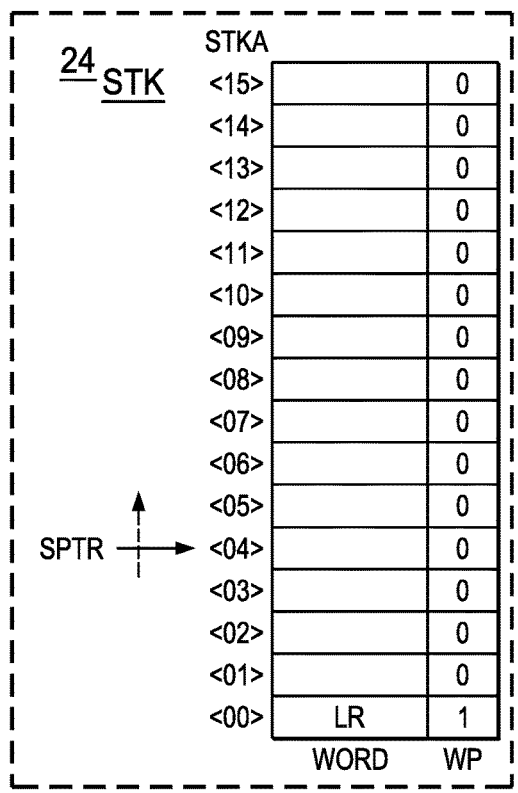
Figure 4D:
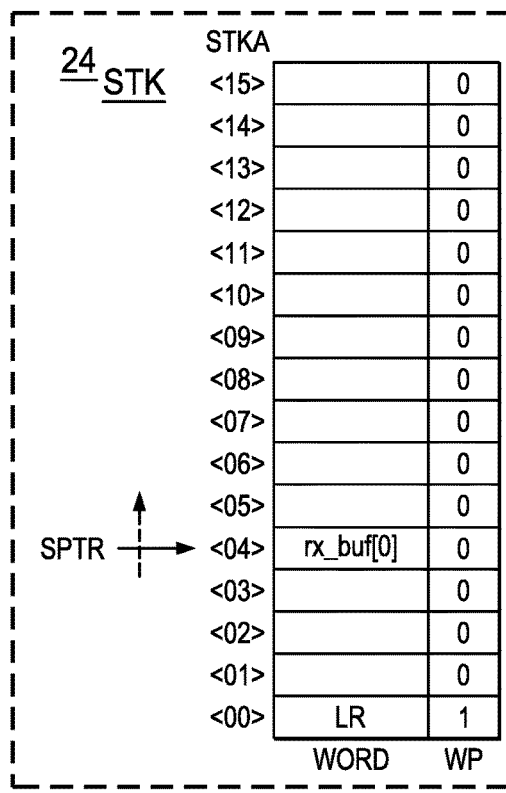
Figures 4E, 4F:
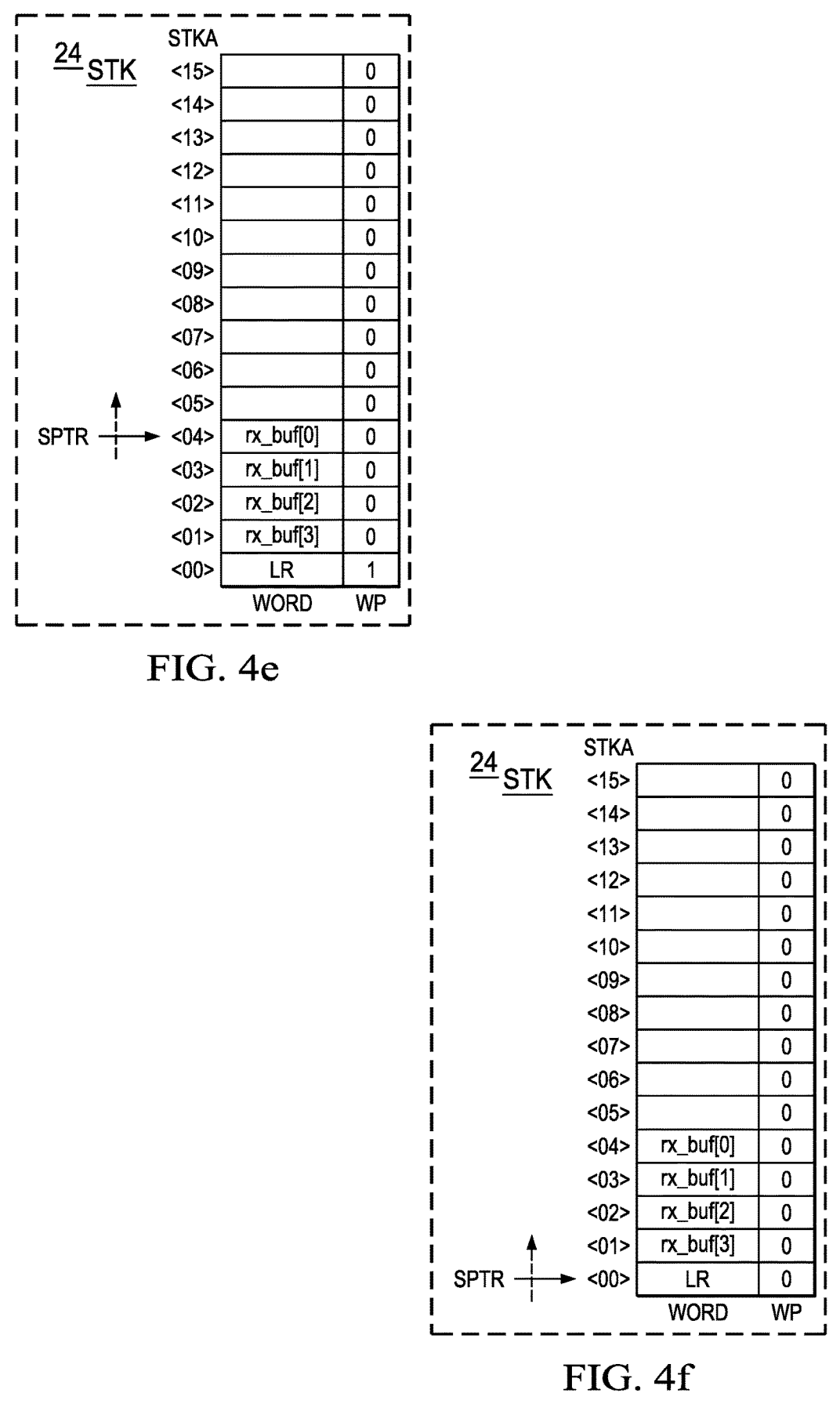

While the above example of FIGS. 4a through 4f depicts a successful push and pop of a return address to stack $24_{STK}$, an additional example is now described in which a protective aspect, as provided by example embodiments, will be appreciated. Specifically, the above example, as shown in FIGS. 4d and 4e, assumes that the buffer length is four words, as passed by the variable rx_buff, however, assume now, either by mistake or intentional hacking effort, that variable rx_buff is five or more (e.g., eight words, in which case rx_buff[8]). With reference to FIG. 4e, therefore, after each of the first four words is copied into stack $24_{STK}$, then the next attempted write, that is, of rx_buff[5], will be at STKA<00>; this attempted write is first detected by step 302 of method 300, and then step 304 determines the WP indicator bit at STKA<00> is set. In the example as shown in FIG. 4e, the condition of step 304 is affirmative, that is, the WP indicator bit is set for that location. As a result, method 300 continues to step 308 and a fault is generated; note now that as part of, or in addition to, the fault generation, the write is blocked, in response to the set WP indicator bit. Note, therefore, in an example embodiment part of the fault generation (or in addition to or in lieu thereof) thwarts the C language effort to overwrite the stored return address at STKA<00>, thereby avoiding a "smashing" of the stack. Hence, if there is a later return to stack $24_{STK}$, the proper return address is maintained, and there is not the ability to jump or transition to an address other than a proper stack-located return address. Indeed, the above example of copying a buffer is but one possible approach, but in all events the earlier detection of a push of a return address to the stack is subsequently protected from a later overwrite by virtue of the respective set WP indicator bit, unless and until there is a subsequent pop of that address, in which case the respective set WP indicator bit is cleared.

Figure 5:
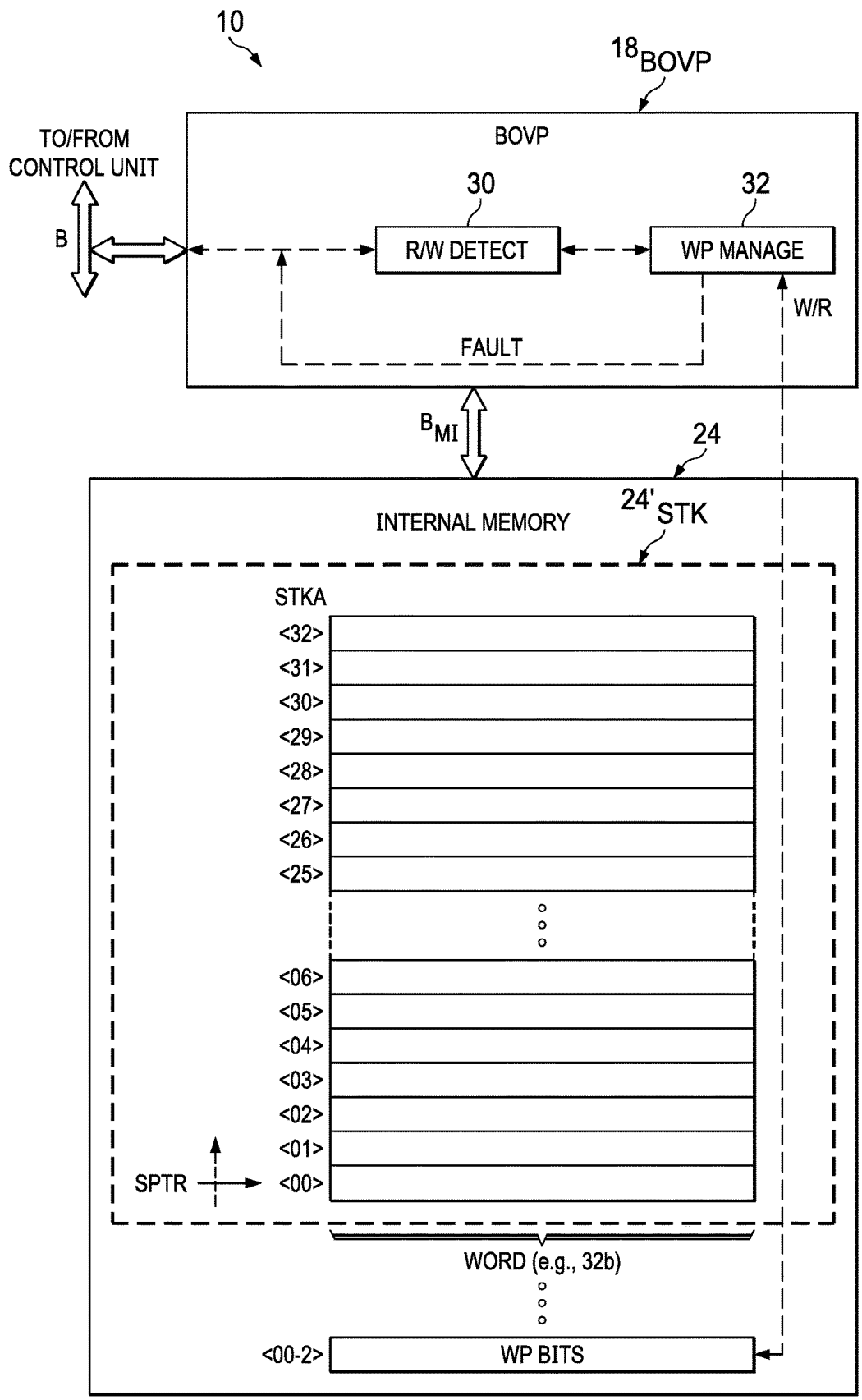
FIG. 5 illustrates the blocks of FIG. 2, but with an alternative embodiment for the stack.

FIG. 5 again illustrates the blocks of FIG. 2, but with an alternative example embodiment for the stack, indicated by way of distinguishing reference as stack $24'_{STK}$. Like stack $24_{STK}$, $24'_{STK}$ includes a WP indicator bit for each address location into which address data may be written, but instead of appending an additional bit onto each word, a collection of the WP indicator bits is stored in a single memory location, which could be a memory location somewhere near the stack and therefore is shown by example at an address two locations below stack address <00> and therefore shown as address <00-2>, or in another instance the single WP-storing word could be one of the stack words, where note that the additional word itself may or may not be protected. Moreover, since each memory word in stack $24'_{STK}$ does not include an additional bit as was the case for sack $24_{STK}$, then each word in FIG. 5 is 32 bits wide, rather than the 33 bits of $24_{STK}$. Sill further, because a single memory word can therefore support a total of 32 WP indicator bits, then preferably each different WP indicator bit corresponds to a respective different memory location in stack $24'_{STK}$, where for example, therefore, the least significant bit at STKA<00-2> represents a WP indicator bit for the least significant stack word at STKA<00>. In a similar manner, each more significant bit at STKA<00> represents a WP indicator bit for the next most significant stack word above STKA<00>, with a mapping of each WP indicator bit in STKA<00-2> to a respective word, as shown in the following Table 2:

TABLE 2

| WP indicator bit position for STKA <00-2> | STKA word address | WP indicator bit position for STKA <00-2> | STKA word address | WP indicator bit position for STKA <00-2> | STKA word address | WP indicator bit position for STKA <00-2> | STKA word address |
|---|---|---|---|---|---|---|---|
| 0 | <00> | 8 | <08> | 16 | <16> | 24 | <24> |
| 1 | <01> | 9 | <09> | 17 | <17> | 25 | <25> |
| 2 | <02> | 10 | <10> | 18 | <18> | 26 | <26> |
| 3 | <03> | 11 | <11> | 19 | <19> | 27 | <27> |
| 4 | <04> | 12 | <12> | 20 | <20> | 28 | <28> |
| 5 | <05> | 13 | <13> | 21 | <21> | 29 | <29> |
| 6 | <06> | 14 | <14> | 22 | <22> | 30 | <30> |
| 7 | <07> | 15 | <15> | 23 | <23> | 31 | <31> |

Lastly, note in FIG. 5 that WP manage block 32 of BOVP circuit $18_{BOVP}$ is shown coupled to access only the word at address <00-2>, as that word is the one in which read/write occurs with respect to WP indicator bits. Thus, consistent with various steps in method 300, WP manage block 32 may either read or write each bit of the word at address <00-2>, such as by reading the entire word and then reading or writing a bit therein (in the latter case, then re-writing the entire word, with a changed bit therein, back to address <00-2>).

Figure 6:
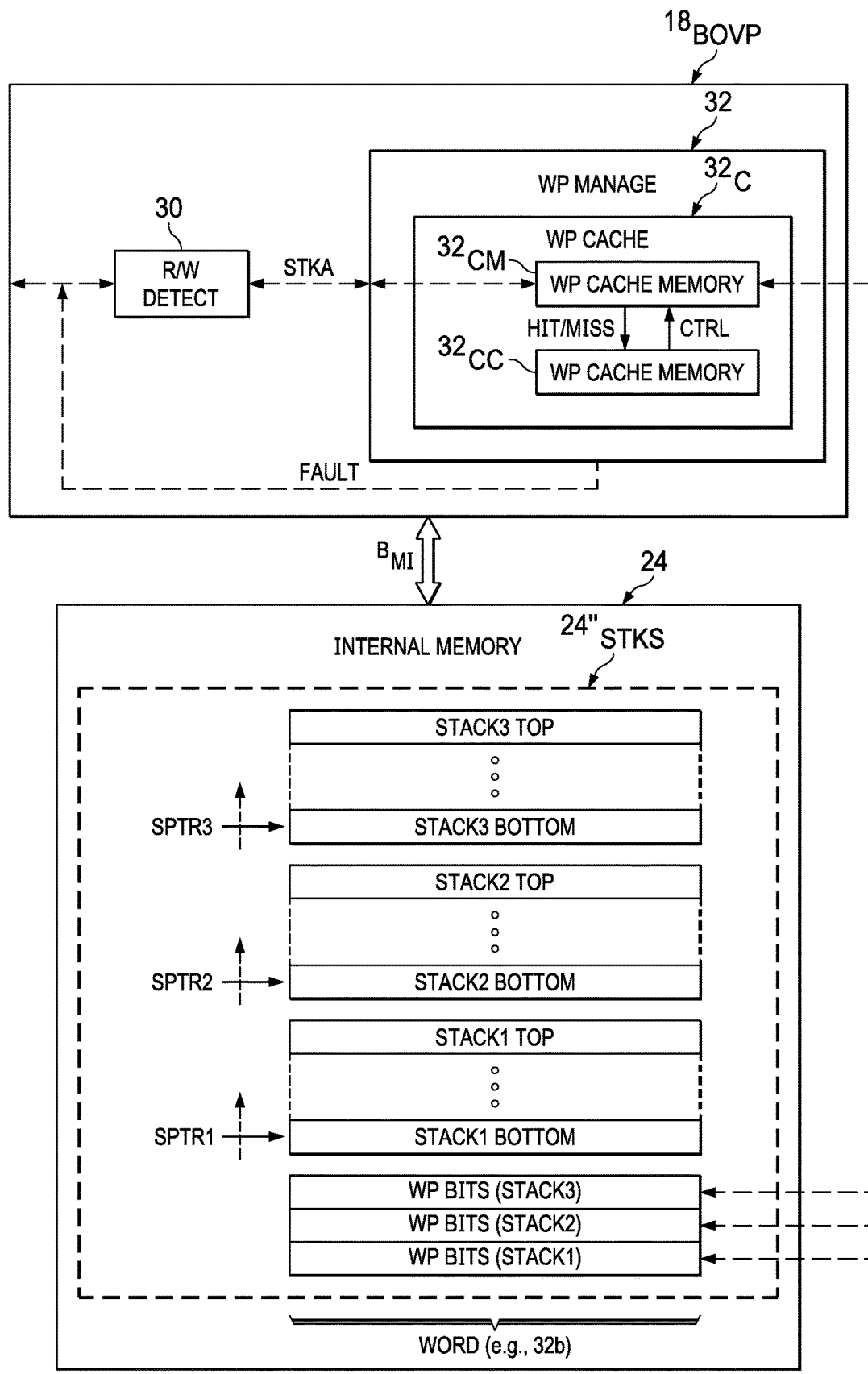
FIG. 6 illustrates an electrical and functional block diagram of another embodiment implementation of internal memory 24 and WP manage block 32 from FIG. 2.

FIG. 6 illustrates an electrical and functional block diagram of another example embodiment implementation of internal memory 24 and WP manage block 32. Each of these blocks is described below.

Looking first to internal memory 24, stacks 24"$_{STKS}$ is shown to represent that a device (e.g., processor) may include in its memory space more than one stack. Thus, whereas FIG. 5 illustrates a single block of R/W memory space that comprises 32 address/buffer words and one WP indicator word, FIG. 6 provides a plurality (e.g., three) of stack blocks, with each block having a respective WP indicator space. In the illustrated approach, specific sizes are not provided, as it should be understood that in alternative example embodiments, the stack size may vary and, hence, so may the WP bits corresponding to each stack. Thus, in one example, each stack may be 32 words and each WP bit space may be 32 bits, but in other variations the stack sizes could all be the same and be other than 32 words, or one or more could differ from the other(s), and correspondingly so may the space needed to accommodate the respective WP bits. Hence, the generality of FIG. 6 in this respect is intended to demonstrate the breadth of alternative example embodiments, where the WP bits (or other indicators) for a given stack do not have to be stored below all of the stacks, as they can be stored anywhere, other than within a stack. Hence, WP bits can be positioned between the stacks (e.g., between STACK1 and STACK2, or between STACK2 and STACK3 in FIG. 6), before all the stacks, after all the stacks, or in some other memory area completely.

Also in FIG. 6, WP manage block 32 is shown to include a WP cache 32$_C$, which further includes a cache memory 32$_{CM}$ and a cache control 32$_{CC}$. Cache memory 32$_{CM}$ is coupled to receive a stack address STKA either to which a write is desired, or from which a read is desired, consistent with the earlier discussion of method 300. Cache memory 32$_{CM}$ is also coupled to the WP data corresponding to stacks 24"$_{STKS}$, and therefore memory words of WP indicator bits may be fetched from stack space 24"$_{STKS}$ into the cache memory 32$_{CM}$ according to principles known in the cache art. Thus, when a stack address STKA is received, if the sought WP data word (e.g., the 32 bits of WP indicators) that includes the particular WP indicator bit corresponding to STKA is already in cache memory 32$_{CM}$, a cache hit occurs and that data is immediately available for processing (i.e., either reading or writing) per method 300; to the contrary, if, when a stack address STKA is received, the sought WP indicator word that includes the particular WP indicator bit corresponding to STKA is not in cache memory 32$_{CM}$, then a cache miss occurs and that data is retrieved from stack space 24"$_{STKS}$ into cache memory 32$_{CM}$, and thereafter is available for processing. In this manner, therefore, note also that for an example of 32 bit addressing, the five least significant bits of the address provide an offset for the cache access, while the 27 most significant bits provide a cache tag.

Some processors support multiple stacks concurrently. For example, the processor may provide two stack pointers, one intended for use by an Operating System, the other for use by the application. (One example is the MSP and PSP stack pointers in some ARM processors.) Another example embodiment provides coverage for all the concurrent stacks the processor supports. In this embodiment, the WP bits are expanded to multiple bits represented by SPID:WP, where SPID is a set of bits large enough to uniquely encode a value for each stack pointer in the processor and WP is the write protect bit. During execution in the processor, the processor tracks which stack pointer is active. WP manage block 32 monitors signals from the processor to determine which stack pointer is in use. When writing the WP bit for an address, the SPID is also written by WP manage block 32. When WP manage block 32 has indication from the processor that an address is popped, WP manage block 32 only clears the SPID and WP bits for that address if the currently active stack pointer matches the SPID bits stored for that address. In addition, WP manage block 32 provides an enable/disable signal for each stack pointer being monitored. In addition, WP manage block 32 provides configuration registers for each monitored stack pointer to set where in memory the WP bits are stored for that stack. The enable/disable signals may be blocked from changing unless the processor is in a certain mode (such as a privileged mode). The enable/disable signal along with the configuration registers allow an operating system to halt monitoring of the stack used by a thread/application while the operation system performs a thread switch. The operating system would disable monitoring for stack pointer A, write the location of the WP bits in memory to the configuration register for stack pointer A, change the value in stack pointer A to the appropriate value for the thread the operating system is about to run, and then re-enable monitoring for stack pointer A. This sequence of operations allows thread switching to occur (which changes the value in a stack pointer) without risk of triggering the WP manage block's pop detection logic.

From the above, example embodiments provide improved processors with hardware support to protect against stack buffer overflows. As a result, example embodiment processors are less susceptible to coding errors or deliberate attacks that may cause undesirable or even nefarious stack operation. Moreover, the hardware aspects reduce time overhead as compared to software-based techniques, such as avoiding recompilation of source code and reducing both testing and run-time overhead. Example embodiments also remove burdens from software developers, both in mitigating the need for protective software and also reducing the need for software developers to have a deeper architecture understanding that otherwise would be needed to address concerns that are reduced by example embodiments. Thus, the example embodiments have been shown to have numerous benefits, and various embodiments have been provided. As still other benefits, the example embodiments contemplate various alternatives, some of which have been described above, as well as others. For example, while an example embodiment has been described in the context of a 32-bit word architecture, the inventive scope may be applied to other word length architectures. As another example, while examples have been shown wherein stack WP indicator bits have been stored in the stack and/or cached, other associations between a bit, flag, or other protective indicator, including plural bits and a possible relationship of those bits to another (e.g., through logic AND, OR, or the like) with one another or other conditions, may be made so as to hardware protect a respective stack location into which a program counter address is stored (e.g., pushed), thereby reducing the possibility of an untimely or unscrupulous overwriting of such an address. As yet another example, while in an example embodiment the WP bit prevents a write to a protected space to be written, in an alternative example embodiment the write may occur and then be detected, so that while the data overwritten is not recoverable, a fault is still created so that the overwriting data is not permitted to be used as an erroneous target address. As still another example, an example embodiment may include the ability to allow instructions executed on the CPU (e.g., while the CPU is in a privileged state) to adjust the memory addresses being monitored for write-protection as part of the stack. For example, when running a real time operation system (RTOS), multiple stacks are used and, while an example embodiment monitors changes to the stack pointer registers of the CPU, when the RTOS swaps stacks, that change is preferably not interpreted as a push or pop and therefore a precipitating condition in an example embodiment method, such as shown in FIG. 3. Still other examples will be ascertainable by one skilled in the art, given the teachings of this document. Accordingly, while various alternatives have been provided, one skilled in the art should further appreciate that various substitutions, modifications or alterations can be made to the descriptions set forth above without departing from the inventive scope, as is defined by the following claims.

The invention claimed is:

1. A circuit comprising:
a memory stack that includes memory locations, wherein each of the memory locations is configured to store a respective write protection indicator; and
a buffer overflow protection circuit coupled to the memory stack, the buffer overflow protection circuit including:
a detection circuit configured to detect a read or a write associated with the memory stack; and
a write protection circuit coupled to the detection circuit, the write protection circuit configured to control the respective write protection indicator of each of the memory locations and generate a fault signal;
wherein the fault signal indicates an attempted write to a first memory location of the memory locations, the first memory location having a first write protection indicator set to write protect.

2. The circuit of claim 1, wherein:
the write protection circuit includes a cache memory and a cache control.

3. The circuit of claim 2, wherein:
the cache memory is configured to store a subset of the write protection indicators.

4. The circuit of claim 2, wherein:
in response to receiving a first instruction to access the first memory location, the cache memory is searched for the first write protection indicator.

5. The circuit of claim 4, wherein:
in response to a cache miss for the first write protection indicator, the cache control is configured to:
search the memory stack for the first write protection indicator; and
store the first write protection indicator in the cache memory.

6. The circuit of claim 1, wherein:
in response to the detection circuit detecting a first read access of the first memory location, the buffer overflow protection circuit is configured to determine whether the first read access is a pop operation.

7. The circuit of claim 6, wherein:
in response to determining the first read access is the pop operation, the write protection circuit is configured to clear the first write protection indicator associated with the first memory location.

8. A processor comprising:
a memory stack that includes memory locations, wherein each of the memory locations is configured to store a respective write protection indicator; and
a buffer overflow protection circuitry coupled to the memory stack, the buffer overflow protection circuitry including:
a detector configured to detect a read or a write associated with the memory stack; and
write protection circuitry coupled to the detector, the write protection circuitry configured to control the respective write protection indicator of each of the memory locations and generate a fault signal;
wherein the fault signal indicates an attempted write to a first memory location of the memory locations, the first memory location having a first write protection indicator set to write protect.

9. The processor of claim 8, wherein:
the write protection circuitry includes a cache memory and a cache control.

10. The processor of claim 9, wherein:
the cache memory is configured to store a subset of the write protection indicators.

11. The processor of claim 9, wherein:
in response to receiving a first instruction to access the first memory location, the cache memory is searched for the first write protection indicator.

12. The processor of claim 11, wherein:
in response to a cache miss for the first write protection indicator, the cache control is configured to:
search the memory stack for the first write protection indicator; and
store the first write protection indicator in the cache memory.

13. The processor of claim 8, wherein:
in response to the detector detecting a first read access of the first memory location, the buffer overflow protection circuitry is configured to determine whether the first read access is a pop operation.

14. The processor of claim 13, wherein:
in response to determining the first read access is the pop operation, the write protection circuitry is configured to clear the first write protection indicator associated with the first memory location.

15. A method comprising:
receiving, by a buffer overflow protection circuit, a first instruction, wherein the buffer overflow protection circuit is coupled to a memory stack that includes memory locations that each are configured to store a respective write protection indicator;
detecting, by a detection circuit in the buffer overflow protection circuit, a read or a write associated with the memory stack; and
generating, by a write protection circuit in the buffer overflow protection circuit, a fault signal in response to an attempted write to a first memory location of the memory locations, the first memory location having a first write protection indicator set to write protect.

16. The method of claim 15, wherein:
the write protection circuit includes a cache memory and a cache control.

17. The method of claim 16, wherein:
the cache memory is configured to store a subset of the write protection indicators.

18. The method of claim 16, wherein:
in response to receiving the first instruction, wherein the first instruction requests access to the first memory location, the cache memory is searched for the first write protection indicator.

19. The method of claim 18, wherein:
in response to a cache miss for the first write protection indicator, the cache control of the buffer overflow protection circuit is configured to:
search the memory stack for the first write protection indicator; and store the first write protection indicator in the cache memory.

20. The method of claim 15, wherein:

in response to the detection circuit detecting a first read access of the first memory location associated with the first instruction, determining, by the buffer overflow protection circuit, whether the first read access is a pop operation; and in response to determining the first read access is the pop operation, clearing, by the write protection circuit, the first write protection indicator associated with the first memory location.

\* \* \* \* \*